US008006251B2

(12) United States Patent  (10) Patent No.: US 8,006,251 B2
Maeda et al.  (45) Date of Patent: Aug. 23, 2011

(54) OPERATION CONSISTENCY MAINTENANCE METHOD, SYSTEM AND PROGRAM

(75) Inventors: Hiroyuki Maeda, Kawasaki (JP); Daisuke Imaizumi, Sapporo (JP); Naomi Ito, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1000 days.

(21) Appl. No.: 11/904,419

(22) Filed: Sep. 26, 2007

(65) Prior Publication Data

US 2008/0155566 A1   Jun. 26, 2008

(30) Foreign Application Priority Data

Dec. 22, 2006  (JP) ................................ 2006-345208

(51) Int. Cl.
  *G06F 13/00*  (2006.01)
(52) U.S. Cl. ...................................................... 719/320
(58) Field of Classification Search .................... 719/320
  See application file for complete search history.

(56) References Cited

U.S. PATENT DOCUMENTS

2007/0244938 A1*  10/2007  Michael et al. ............... 707/204

FOREIGN PATENT DOCUMENTS

JP   06-301436   10/1994
JP   2000-322393  11/2000

* cited by examiner

*Primary Examiner* — Andy Ho
(74) *Attorney, Agent, or Firm* — Kilpatrick Townsend & Stockton LLP

(57) ABSTRACT

To provide a technology capable of maintaining the consistency of a managed object even when an existing operation program is used for manipulation without modifying the existing operation program when the managed object itself on an execution base is expanded. An operation consistency maintenance method for an operation consistency maintenance system which maintains operation consistency of an application which operates on an application server comprises reading, from a storage device, manipulation control information indicating a manipulation control method when middleware is manipulated from an application operation program, and transmitting a call for inhibiting a manipulation request or for changing a calling operation function based on the read manipulation control information to the application server by a communication device; and receiving the call by the application server by means of the communication device, and calling either an application operation function or a middleware operation function indicated by the received call.

6 Claims, 7 Drawing Sheets

OPERATION FUNCTION LIST INFORMATION

| OPERATION FUNCTION (2110) | OPERATION FUNCTION DETAILS (2111) | CALL DESTINATION INFORMATION (2112) |
|---|---|---|
| APPLICATION OPERATION FUNCTION 310 | START-UP | appStart() |
| | STOP | appStop() |
| | ⋮ | ⋮ |
| MIDDLEWARE OPERATION FUNCTION 311 | START-UP | midAStart() |
| | STOP | midAStop() |
| | MIDDLEWARE-SPECIFIC FUNCTION | midAOriginalWork() |
| | ⋮ | ⋮ |
| MIDDLEWARE OPERATION FUNCTION 312 | START-UP | midBStart() |
| | STOP | midBStop() |
| | MIDDLEWARE-SPECIFIC FUNCTION | midBOriginalWork() |
| | ⋮ | ⋮ |

2113 (rows for Middleware Operation Function 311)
2114 (rows for Middleware Operation Function 312)

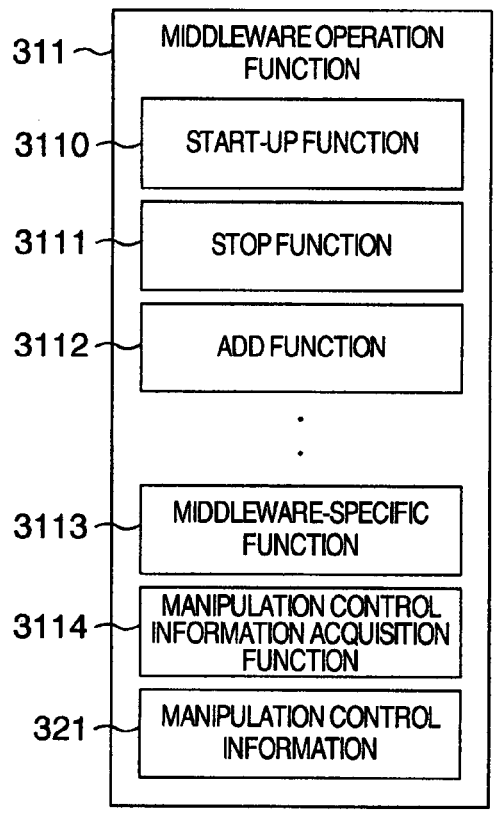

FIG.6

DEPENDENCY RELATION INFORMATION (210)

| | APPLICATION NAME (2100) | APPLICATION 411 | APPLICATION 412 |
|---|---|---|---|
| | MIDDLEWARE NAME (2101) | MIDDLEWARE 411 | MIDDLEWARE 412 |
| MANIPULATION CONTROL TYPE (2102) | START-UP | INHIBIT | SWITCHING |
| | STOP | INHIBIT | SWITCHING |
| | ADDITION | INHIBIT | SWITCHING |
| | DELETION | INHIBIT | SWITCHING |
| | ACQUISITION OF DEFINITION | TAKEOVER | INHIBIT |
| | SETTING OF DEFINITION | TAKEOVER | INHIBIT |
| | ACQUISITION OF OPERATION INFORMATION | TAKEOVER | INHIBIT |

(2103)

OPERATION CONSISTENCY MAINTENANCE METHOD, SYSTEM AND PROGRAM

INCORPORATION BY REFERENCE

The present application claims priority from Japanese application JP2006-345208 filed on Dec. 22, 2006, the content of which is hereby incorporated by reference into this application.

BACKGROUND OF THE INVENTION

1. Field of the Invention

The present invention relates to an operation consistency maintenance technology for maintaining the operation consistency of an application which operates on an application server of a computer system.

2. Description of the Related Art

For a managed object such as an application which is present on an execution base, there are an operation function for executing an operation and an operation program such as a GUI (Graphical User Interface) corresponding to it. For manipulation of the managed object from the operation program, there is devised a system that the operation function is also added in conformity with the expansion of the execution base to associate the manipulation with the operation function, so that the operation program such as the GUI can be expanded easily (JP-A-6-301436).

There is also devised a system that a suppressing/correcting means for manipulations from an operation program is newly disposed in accordance with the functions of plural execution bases each having a different function to manage the operation in an integrated fashion (JP-A-2000-322393).

SUMMARY OF THE INVENTION

When the managed object itself on the execution base is expanded (hereinafter called the middleware) to add an operation function and an operation program is also expanded newly, it becomes possible to manipulate from the new operation program, but it is also possible to manipulate from the existing operation program according to the conventional technology. As a result, when the existing operation program is used to manipulate, there might be generated manipulations that the managed object consistency cannot be maintained. For example, in a case where new middleware is realized on an application server program, a new operation function and operation program are installed, but inconsistency is generated when the new middleware is manipulated by the existing operation program. More specifically, when a start-up function of the new middleware causes the existing start-up function to involve the initialization of a database (DB), the middleware is started without the initialization of the DB if the start-up is executed from the existing operation program.

The present invention has been made in view of the above circumstances and provides a technology capable of maintaining the consistency of a managed object even when an existing operation program is used for manipulation without modifying the existing operation program when the managed object itself on an execution base is expanded.

The present invention relates to an operation consistency maintenance system for maintaining the operation consistency of an application which operates on an application server, comprising inhibiting a manipulation request or changing a calling operation function based on manipulation control information indicating a manipulation control method when the middleware is manipulated from an application operation program.

The operation consistency maintenance system of the invention is an operation management system for controlling manipulation from an existing application operation program to middleware which is disposed on an application server and added with a function specific to the application, wherein an operation control unit is disposed to inhibit a manipulation request or to change a calling operation function based on the manipulation control information indicating a manipulation control method when the middleware is manipulated from the application operation program.

For example, the operation control unit is provided with a dependency relation generation unit which collects manipulation control information about single or plural middleware and determines it as dependency relation information and a dependency relation judging unit which refers to the dependency relation information to decide a manipulation control method when the middleware is manipulated from the application operation program, and performs the manipulation control described below to maintain the consistency of the managed object.

Specifically, when a manipulation from an existing operation program is desired to be inhibited, "inhibit" is applied, when a new operation function is desired to be manipulated from the existing operation program without generating a new operation program, "switching" is applied, and when an existing operation function can be reused as it is as a sufficient function, "takeover" is applied.

For example, the operation control unit is preferably provided with the dependency relation generation unit which obtains operation function list information from the operation function providing unit and a function call unit which calls an operation function decided by the dependency relation judging unit with reference to the operation function list information. In this case, the operation function decided by the dependency relation judging unit can be called without making a change to the operation control unit even when the operation function is added.

According to the present invention, the consistency of the managed object can be maintained even when the existing operation program is used to perform the manipulation without modifying the existing operation program when the managed object itself on the execution base is expanded.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing in detail operation function list information 211 according to the embodiment.

FIG. 4 is a diagram showing in detail a middleware operation function 311 according to the embodiment.

FIG. 5 is a diagram showing in detail manipulation control information 321 according to the embodiment.

FIG. 6 is a diagram showing in detail dependency relation information 210 according to the embodiment.

DESCRIPTION OF THE INVENTION

An operation consistency maintenance system according to an embodiment of the present invention to maintain the operation consistency of an application which operates on an application server is described below.

Figure 1:
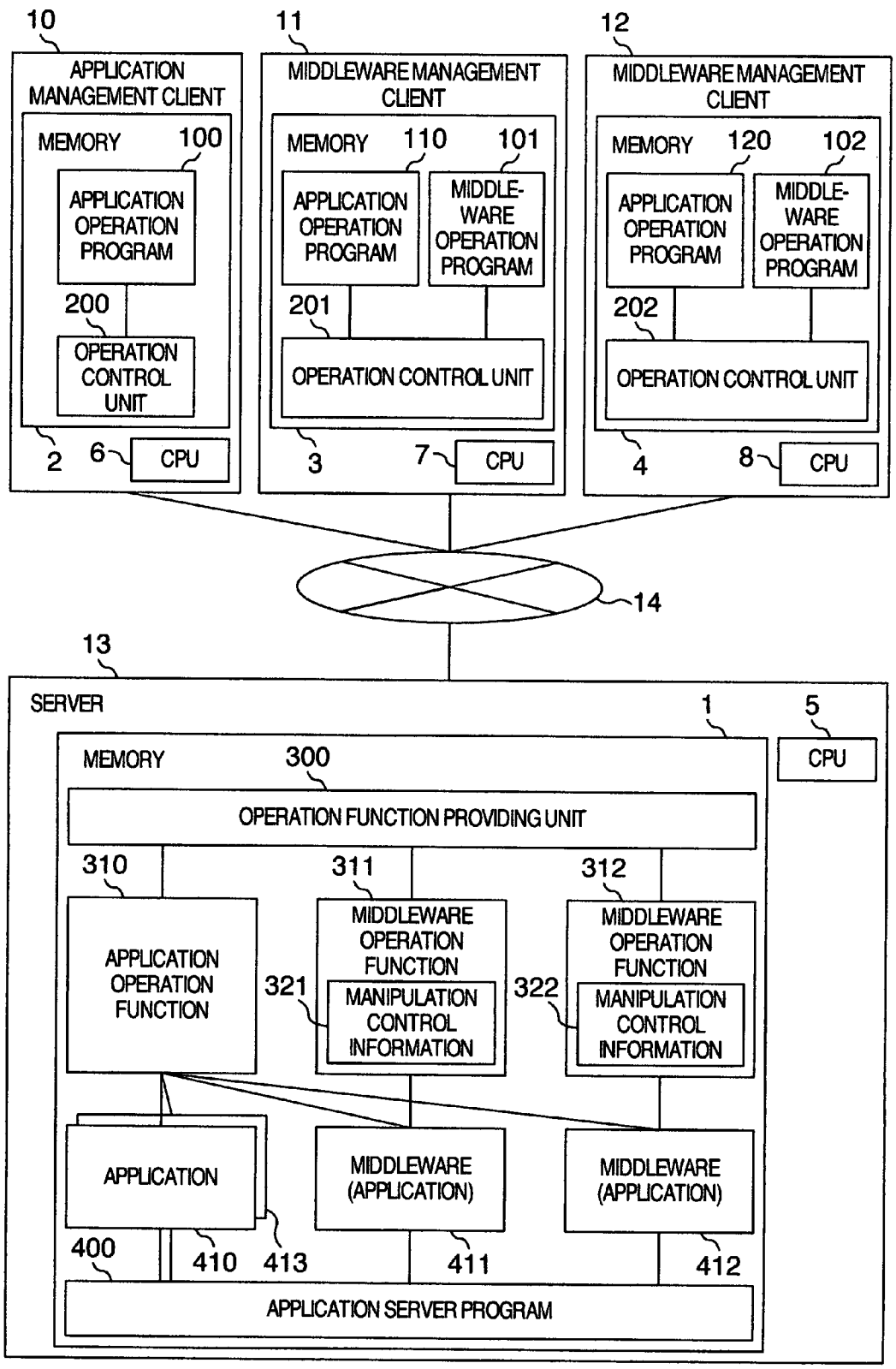
FIG. 1 is a diagram showing the whole construction of an operation consistency maintenance system according to an embodiment of the present invention.

FIG. 1 is a diagram showing the whole construction of the operation consistency maintenance system according to the embodiment. In FIG. 1, an application operation management system has a server 13 connected to an application management client 10, a middleware management client 11 and a middleware management client 12 over a network 14 such as the Internet. In FIG. 1, they are disposed on different computers but may be partly or entirely disposed on the same computer.

In FIG. 1, the server 13 is composed of a memory 1 and a CPU 5, the memory 1 has therein an application server program 400 which is an execution base of applications, and the application server program 400 has thereon an application 410, middleware 411, middleware 412 and an application 413 to execute the functions provided by the individual applications and middleware. The middleware is a kind of application and has a unique add function in addition to the common function possessed by the applications. Therefore, the middleware has a name as the middleware in addition to the name as an application.

An application operation function 310 performs a processing to operate each application including the middleware. The application operation function 310 performs the operation processing of the above-described common function on all the applications ranging from the application 410 to the application 413. And, the middleware operation function 311 and a middleware operation function 312 are operation functions dedicated to the operation processing of the middleware 411 and the middleware 412. The middleware is function-expanded in comparison with an ordinary application, so that the middleware operation function 311 and the middleware operation function 312 are function-expanded in comparison with the application operation function 310. While the application operation function 310 can perform the operation processing of all the applications, the middleware operation function 311 and the middleware operation function 312 each perform only the operation processing of the middleware 411 and the middleware 412.

To manipulate the applications 410 to 413, a user executes an application operation program 100. An application operation program 110 and an application operation program 120 also provide the same function as the application operation program 100 does. To manipulate the middleware 411 and the middleware 412, middleware operation programs 101 and 102 are executed. The middleware operation programs 101 and 102 are programs dedicated to calling of the middleware operation function 311 and the middleware operation function 312 and perform operation manipulations of the middleware 411 and the middleware 412 as the middleware respectively.

The application management client 10 is composed of a memory 2 and a CPU 6, and the memory 2 includes the application operation program 100 and the operation control unit 200 and can manipulate the applications 410 to 413. And, the middleware management client 11 is composed of a memory 3 and a CPU 7, and the memory 3 includes the application operation program 110, an operation control unit 201 and the middleware operation program 101 and can manipulate the middleware 411 in addition to the manipulation of all the applications. The middleware management client 12 is composed of a memory 4 and a CPU 8, and the memory 4 includes the application operation program 120, an operation control unit 202 and the middleware operation program 102 and can manipulate the middleware 412 in addition to the manipulation of all the applications.

In a case where the application operation program 100 is executed to manipulate an intended function of a certain application, the operation control unit 200 is requested to manipulate. The operation control unit 200 specifies an operation function capable of performing a processing corresponding to the requested manipulation and calls an optimum operation function among the application operation function 310, the middleware operation function 311 and the middleware operation function 312 via an operation function providing unit 300. The operation control unit 201 and the operation control unit 202 also provide the same function as the operation control unit 200.

The operation control units 200 to 202 have an object to judge an optimum operation function corresponding to a combination of the application intended by the user and the intended operation manipulation. For example, a start-up function of the middleware operation function 311 which is an operation function dedicated for the middleware 411 is to perform initialization of the DB subsequent to the operation processing of the start-up function as a common function possessed by the application operation function of the middleware 411. In this case, when the user uses the middleware management client 11 to initiate a start-up manipulation of the middleware 411 by executing the application operation program 110, it is necessary that the operation control unit 201 calls the start-up function of the middleware operation function 311. If the start-up function of the application operation function 310, which is a general-purpose operation function, is called, the DB is not initialized, and the system inconsistency is generated as a result.

It is determined in this embodiment that a program for functioning the computer as the operation control unit or the operation function providing unit is recorded on a recording medium such as a CD-ROM, stored in a magnetic disk or the like and then loaded to a memory for execution. The recording medium for recording the program may be a recording medium other than the CD-ROM. And, the program may be used by installing from the recording medium into the computer, and the program may be also used by accessing the recording medium over a network.

FIG. 4 is a diagram showing in detail the middleware operation function 311 of the embodiment. The middleware operation function 312 also has the same structure. The middleware operation function 311 has a start-up function 3110, a stop function 3111, an add function 3112 and the like which are common functions as the application operation functions. The common function is a function which is possessed by both the application operation function 310 and the middleware operation function 311 but might be undergone the function expansion as middleware. For example, the start-up function 3110 might initialize the DB subsequent to the start-up function as the application.

The middleware operation function 311 has a middleware-specific function 3113 which is an expansion function with respect to the ordinary application. And, the manipulation control information 321 is information which defines an operation function to be called when the middleware 411 is manipulated from the application operation program 100, 110 or 120. A manipulation control information acquisition function 3114 provides the manipulation control information 321 in response to an acquisition request from the dependency relation generation unit 220 described later.

FIG. 5 is a diagram showing in detail the manipulation control information 321 of the embodiment. As shown in FIG. 5, the manipulation control information 321 is comprised of a manipulation object application of the middleware operation function 311 and an operation method when the individual functions provided by the application are manipulated from the application operation program 100, 110 or 120.

For the operation method, any of "inhibit", "takeover" and "switching" is defined. For example, a row 3210 shown in FIG. 5 indicates that it is the application 411 that the middleware operation function 311 performs the operation processing. And, rows 3211, 3212 and 3213 indicate that operation methods corresponding to a start-up function, a stop function and an add function define "inhibit". Since the manipulation control information 321 holds the control method when the application operation program which is common to the system is executed, information on the middleware-specific function is not included.

The "inhibit" indicates that the manipulation from the application operation programs 100, 110 and 120 is inhibited. The "takeover" indicates that the operation processing of the middleware 411 is performed by the application operation function 310. And the "switching" indicates that the operation processing of the middleware 411 is performed by the middleware operation function 311.

The definition of the "inhibit" means that the use of the application operation function common to the system is a false manipulation, and it inhibits the false manipulation. The definition of the "takeover" means that the application operation functions common to the system are used, and it is convenient to unify the operation method with another application. The definition of the "switching" means that it is manipulatable as middleware by using the application operation program common to the system, and the middleware can be manipulated with the same usability as the ordinary application.

Figure 2:
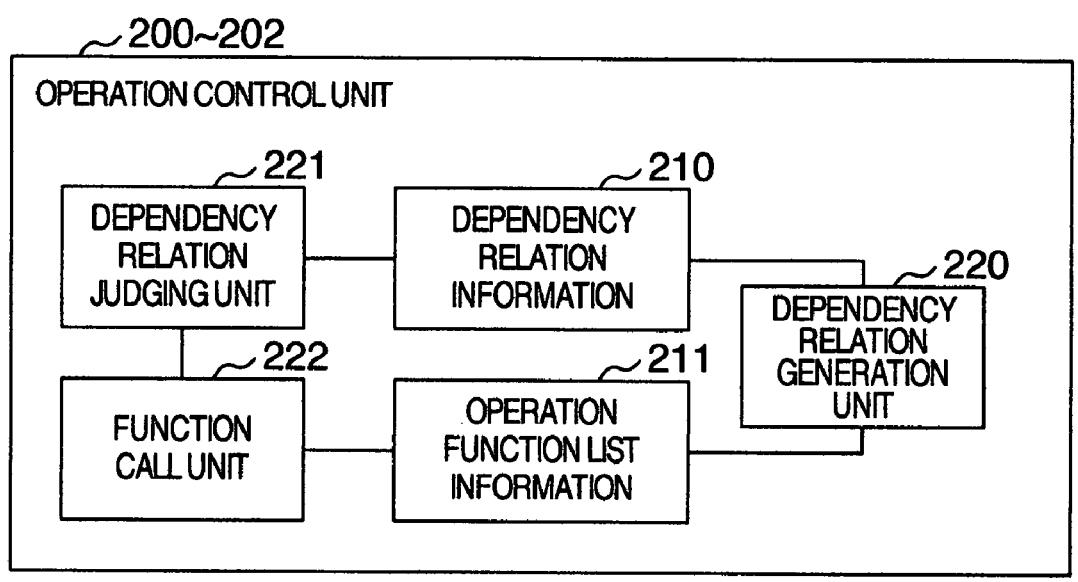
FIG. 2 is a diagram showing in detail an operation control unit 200 according to the embodiment.

The operation control unit 200 is described in further detail. The operation control unit 201 and the operation control unit 202 are also the same. FIG. 2 is a diagram showing in detail the operation control unit 200 of the embodiment. As shown in FIG. 2, the operation control unit 200 holds the dependency relation information 210. The dependency relation information 210 is information which is an aggregation of the manipulation control information 321 and operation control information 322 in FIG. 1 and has a record of the manipulatable control method of each of the functions of the individual middleware.

FIG. 6 is a diagram shown in detail the dependency relation information 210 of the embodiment. As shown in FIG. 6, the dependency relation information 210 is composed of an associated structure of an application name 2100, a middleware name 2101 possessed by the application, and a manipulation control type 2102 of each function. For example, information of a row 2103 shown in FIG. 6 is obtained from the manipulation control information 321 shown in FIG. 5. The manipulation control information 321 is possessed by the middleware operation function 311, and the operation object is the middleware 411, so that the "middleware 411" is stored in the middleware name 2101 of FIG. 6.

FIG. 3 is a diagram showing in detail the operation function list information 211 of the embodiment. The operation function list information 211 of FIG. 2 holds information of call destination information 2112 used to call operation function details 2111 such as "start-up" and "stop" provided by an operation function 2110 as shown in FIG. 3. For example, a row 2113 indicates that "midAStart( )" which is provided by the middleware operation function 311 is called in order to use the start-up function of the middleware operation function 311.

The operation control unit 200 of FIG. 2 also includes the dependency relation generation unit 220, the dependency relation judging unit 221 and the function call unit 222. They all are modules, and their detailed functions are described later.

The dependency relation generation unit 220 shown in FIG. 2 generates the dependency relation information 210 and the operation function list information 211. A processing to generate them is described with reference to FIG. 7.

Figure 7:
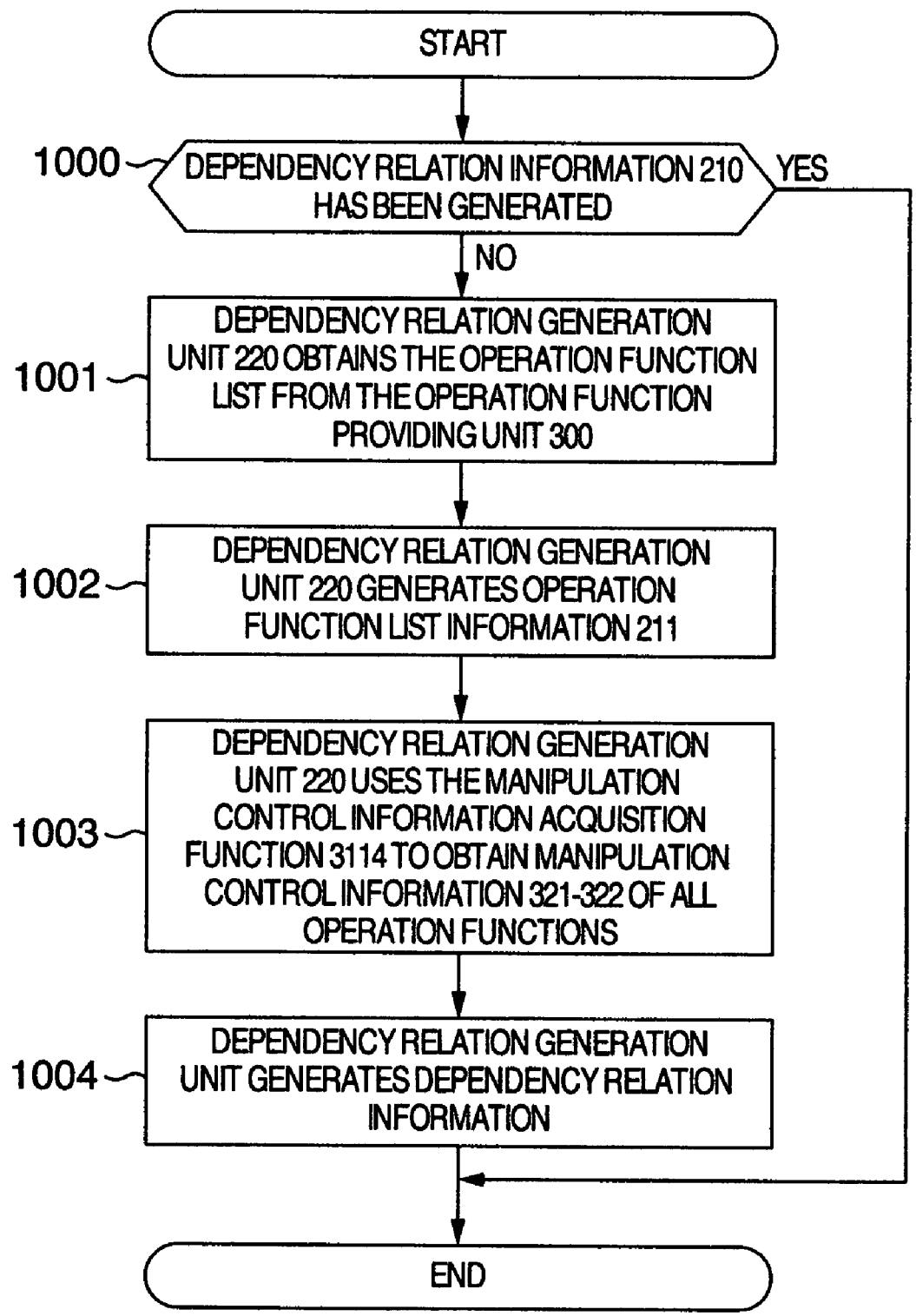
FIG. 7 is a flow chart showing a processing procedure for generation of the operation function list information 211 and the dependency relation information 210 by a dependency relation generation unit 220 according to the embodiment.

FIG. 7 is a flow chart showing a processing procedure for generation of the operation function list information 211 and the dependency relation information 210 by the dependency relation generation unit 220 according to the embodiment. The dependency relation generation unit 220 performs a processing with certain timing, for example, when the system is activated or when the operation control unit 200 receives a first processing request. First, where the dependency relation information 210 has been generated (Yes in 1000), the processing is terminated.

If the dependency relation information 210 has not been generated (No in 1000), the dependency relation generation unit 220 requests the operation function providing unit 300 to obtain the operation function and its call destination information provided by the application and middleware. The operation function providing unit 300 having received the request obtains the operation functions and their call destination information which are provided by the application operation function 310, the middleware operation function 311 and the middleware operation function 312 and returns to the dependency relation generation unit 220 (1001). For example, the operation function provided by the middleware operation function 311 in FIG. 4 includes the start-up function 3110, the stop function 3111, the add function 3112, the middleware-specific function 3113 and the like. The manipulation control information acquisition function 3114 is not included in the operation function, so that it does not become an acquisition object. Then, the operation function list information 211 is generated based on the information obtained from the individual application operation functions (1002).

Then, the dependency relation generation unit 220 calls the manipulation control information acquisition function 3114 shown in FIG. 4 and obtains manipulation control information possessed by the middleware operation functions 311 and 312 (1003). It generates the dependency relation information 210 based on the information obtained from the individual middleware operation functions (1004).

When the user executes the application operation programs 100 to 102 to manipulate the applications, the operation control units 200 to 202 select and call an optimum operation function for the manipulation desired by the user. The user designates the desired application name and the operation function to execute the application operation programs 100 to 102. The user is not conscious that the application desired to be manipulated is middleware.

Figure 8:
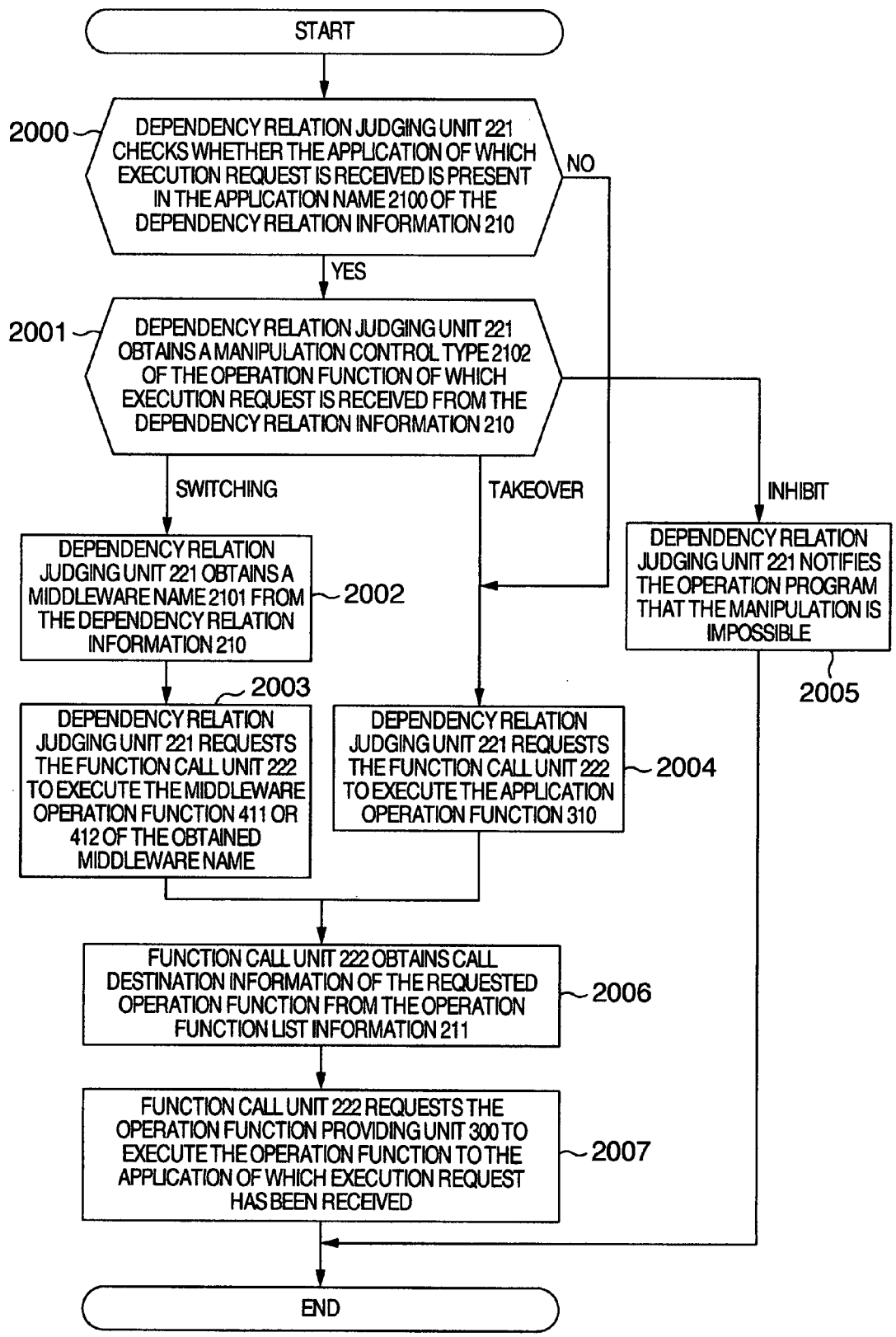
FIG. 8 is a flow chart showing a processing procedure of a dependency relation judging unit 221 and a function call unit 222 according to the embodiment.

FIG. 8 is a flow chart showing a processing procedure of the dependency relation judging unit 221 and the function call unit 222 according to the embodiment. FIG. 8 shows a processing flow from the execution of the application operation program 100 by the user to calling of the operation function.

The processing flow when the application operation programs 110 and 120 are executed is also the same. The user designates the manipulation object application name and the operation functions such as "start-up" and "stop" to execute the application operation program 100. First, the dependency relation judging unit 221 in the operation control unit of FIG. 2 checks whether the application of which execution request is designated from the application operation program 100 is present in the application name 2100 of the dependency relation information 210 shown in FIG. 6 (2000).

In a case where the application of which execution request is designated is present in the application name 2100 (Yes in 2000), it becomes clear that the application is middleware. The dependency relation judging unit 221 refers to the dependency relation information 210 to obtain a manipulation control type of the operation function of which execution request is received (2001). For example, in a case where the user manipulates "start-up" of the "application 411", the manipulation control type 2102 which is obtained by the dependency relation judging unit 221 becomes "inhibit" according to the dependency relation information shown in FIG. 6.

If the obtained manipulation control type is "inhibit" (inhibit in 2001), the dependency relation judging unit 221 notifies the application operation program 100 that the manipulation is impossible (2005). Thus, it is possible to inhibit that the application operation function 310 is called to perform a false manipulation.

If the obtained manipulation control type is "switching" (switching in 2001), the dependency relation judging unit 221 obtains a middleware name from the dependency relation information 210 (2002). For example, when the user performs a manipulation of the "start-up" of the "application 412", the manipulation control type 2102 is "switching" according to the dependency relation information shown in FIG. 6, and the middleware name 2101 becomes the "middleware 412". And, the dependency relation judging unit 221 requests the function call unit 222 to execute the middleware operation function of the obtained middleware name (2003).

The function call unit 222 having received the request obtains call destination information of the requested operation function from the operation function list information 211 (2006). For example, the function call unit 222 which has received a request for a "switching" function of the "middleware 412" finds that the call destination is "midBStart( )" from the row 2114 of the operation function list information 211 shown in FIG. 3. And, the function call unit 222 calls from the operation function providing unit 300 an execution function of the operation function to the application of which execution request has been received (2007). For example, it corresponds to a call for the "midBStart( )". Thus, if the manipulation control information is "switching", the user can call not a general-purpose application operation function but a middleware operation function though the user uses the general-purpose application operation program.

In a case where the application of which execution request is designated is not present in the application name 2100 in step 2000 (it means that the application is an existing application which is not middleware) or where the manipulation control type obtained in step 2001 is "takeover", the dependency relation judging unit 221 requests the function call unit 222 to execute the application operation function (2004) and proceeds to step 2006. Thus, when the execution request is made to the existing application or when the manipulation control information is "takeover", the general-purpose application operation function can be called.

Thus, the dependency relation judging unit 221 refers to the dependency relation information 210 to judge an optimum operation function corresponding to the manipulation control type. In addition, the function call unit 222 refers to the operation function list information 211 to obtain call destination information and to make an execution request of the operation function.

If the manipulation control type is "inhibit", the manipulation cannot be made from the application operation program common to the system, so that when the user operates middleware from the viewpoint of the middleware, the middleware operation program is used for manipulation. For example, in a case where the middleware operation program 101 is used to manipulate for "start-up" of the middleware 411, the dependency relation judging unit 221 does not perform a processing in the operation control unit 201 and requests the function call unit 222 to execute a start-up operation function of the middleware 411 because the manipulation object middleware name and manipulation control information are already known.

According to the application operation management system of the embodiment, a middleware operation method can be defined in unit of function when the user executes the application operation program 100, 101 or 102. When the "inhibit" is defined, the middleware 411 or 412 is inhibited from being executed illegally, and an operation with the consistency of the entire system maintained becomes possible. When the "takeover" is defined, it becomes possible to perform a middleware operation processing from a viewpoint integrated with an ordinary application. Where the "switching" is defined, it becomes possible to perform the middleware operation with the same usability as the ordinary application. Even when new application and middleware are added to the system, this characteristic is maintained, and an operation which maintains consistency is realized without changing the existing operation program at all. Since the existing operation program can be used continuously, a burden on the user is reduced, and the manipulability and serviceability of the system are improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An operation consistency maintenance method for an operation consistency maintenance system which maintains operation consistency of an application which operates on an application server, comprising:
   reading, from a storage device, manipulation control information indicating a manipulation control method when middleware is manipulated from an application operation program, and transmitting a call for inhibiting a manipulation request or for changing a calling operation function based on the read manipulation control information to the application server by a communication device; and
   receiving the call by the application server by means of the communication device, and calling either an application operation function or a middleware operation function indicated by the received call.

2. The operation consistency maintenance method according to claim 1, wherein the manipulation control information about the middleware is collected and stored as dependency relation information into a storage device, and the dependency relation information stored in the storage device is referred to for determination of a manipulation control method when the middleware is manipulated from the application operation program.

3. The operation consistency maintenance method according to claim 1, wherein operation function list information is received from the application server by the communication device and stored in the storage device, and the operation function list information stored in the storage device is referred to for calling the operation function.

4. The operation consistency maintenance method according to claim 2, wherein operation function list information is received from the application server by the communication device and stored in the storage device, and the operation function list information stored in the storage device is referred to for calling the operation function.

5. An operation consistency maintenance system for maintaining operation consistency of an application which operates on an application server, comprising:
   an operation control unit which reads, from a storage device, manipulation control information indicating a manipulation control method when middleware is manipulated from an application operation program, and transmits a call for inhibiting a manipulation request or for changing a calling operation function based on the read manipulation control information to the application server by a communication device; and
   an operation function providing unit which receives the call by the application server by means of the communication device, and calls either an application operation function or a middleware operation function indicated by the received call.

6. A computer readable medium comprising a program with instructions for causing a computer to execute for an operation consistency maintenance system which maintains operation consistency of an application which operates on an application server, the instructions comprising:
   reading, from a storage device, manipulation control information indicating a manipulation control method when middleware is manipulated from an application operation program, and transmitting a call for inhibiting a manipulation request or for changing a calling operation function based on the read manipulation control information to the application server by a communication device; and
   receiving the call by the application server by means of the communication device, and calling either an application operation function or a middleware operation function indicated by the received call.

* * * * *